Nov. 15, 1955   G. V. NOLDE   2,724,062
ELECTRICAL CIRCUIT FOR SUPPRESSING INTERFERENCE
Filed June 25, 1951
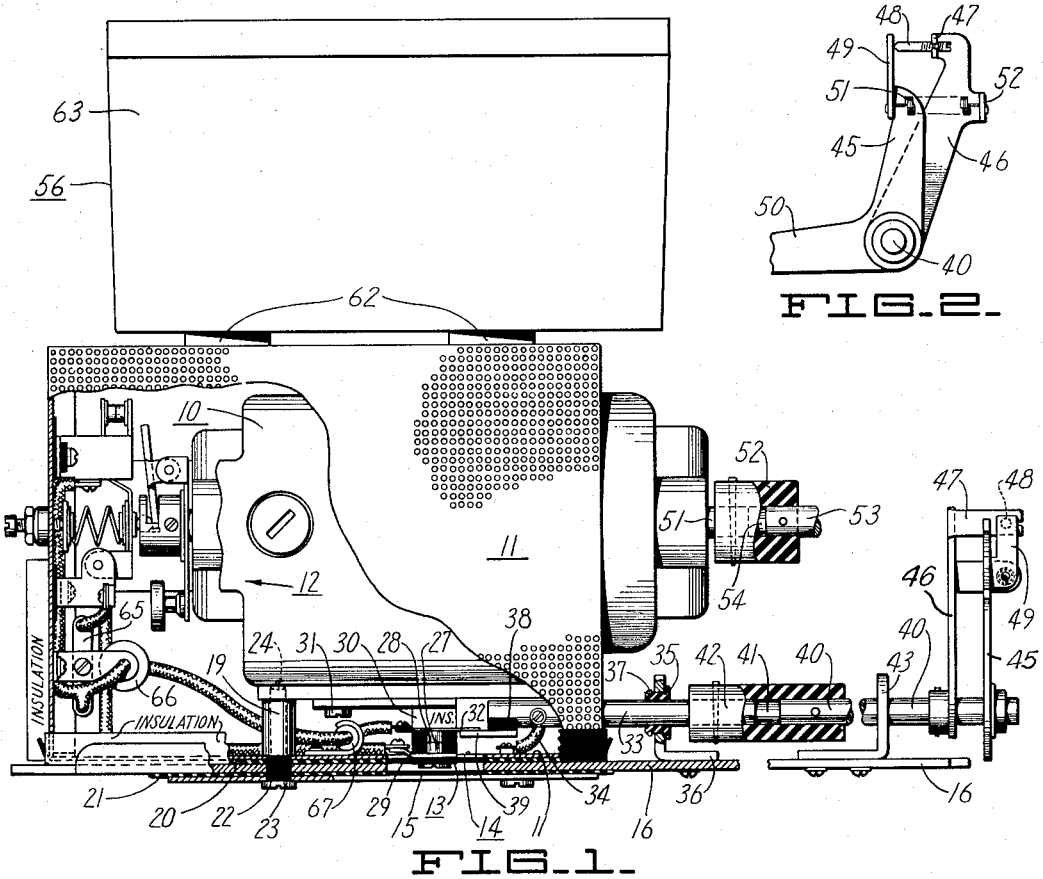
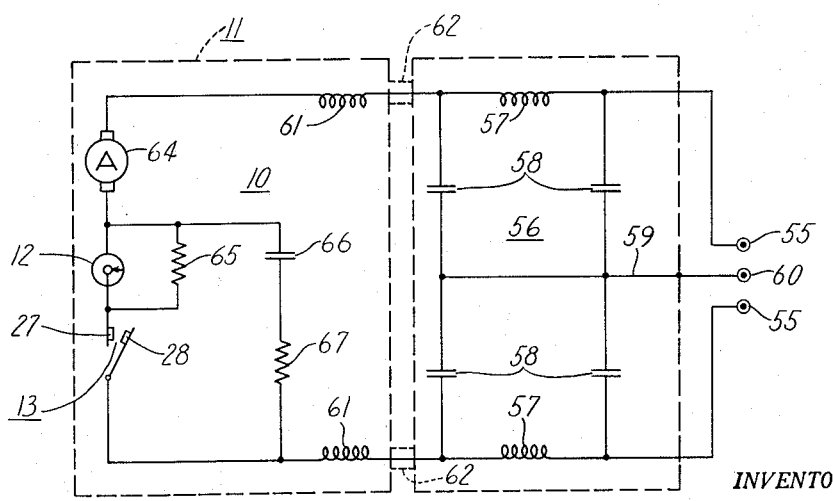
INVENTOR.
George V. Nolde
BY
Howard M. Austin.

United States Patent Office 2,724,062
Patented Nov. 15, 1955

2,724,062

ELECTRICAL CIRCUIT FOR SUPPRESSING INTERFERENCE

George V. Nolde, Berkeley, Calif., assignor to Marchant Calculators, Inc., a corporation of California Application June 25, 1951, Serial No. 233,477

5 Claims. (Cl. 307—105)

The present invention relates to business machines having devices for suppressing the transmission of radio frequency interference signals generated within the machine, and more particularly concerns means for eliminating danger of electric shock to the machine operator due to such suppression devices.

It has been found that during the operation of motor driven calculating machines, or the like, the motor, its start-stop switch and governor, and other similar elements, are likely to cause both radiated and conducted interference with nearby reception of radio and other high frequency signals. It is well known that electromagnetic shielding may be used to suppress the radiated interference. Similarly, conducted interference is conventionally suppressed by introducing a low pass line filter between the machine and the power supply, thereby preventing the radio frequency noise which is generated in the machine from entering the power supply.

Line filters used for this purpose include by-pass condensers which are conventionally connected to ground through the machine frame. Since the capacitance of these condensers must be relatively large to effectively shunt the undesirable high frequencies through the machine frame to ground, the same condensers also shunt a considerable amount of line frequency current through the machine frame. If, for any reason, the lead from the machine frame to ground becomes broken, the path to ground for the shunted current is interrupted and may be re-established through the body of any person touching the machine frame or metallic key parts, etc., which are connected to the machine frame. The present invention eliminates this danger of electrical shock by insulating the machine frame from the entire electrical circuit in the machine, so that substantially no current flows through the machine frame under any circumstances.

It is therefore a principal object of the present invention to eliminate the hazard, to the machine operator, of electrical shock due to the R. F. transmission suppression circuits in a calculating machine.

It is another and more specific object of the invention to ground an interference suppression circuit directly to the power line, maintaining the machine frame insulated from the entire electrical circuit.

It is a further object of the invention to insulate the line filter in a calculating machine from the machine frame.

Other objects of the invention will appear in the following description of a preferred form of the invention, reference being made to the accompanying drawing in which:

Fig. 1 is a front view of the motor and filter with the motor shield partly broken away to show the motor and the control elements therefor.

Fig. 2 is a right side view of a portion of the switch operating mechanism.

Fig. 3 is a wiring diagram of the R. F. transmission suppression circuit for the machine.

In the present invention, the machine motor, the motor governor, and the start-stop switch are enclosed in a shield of conductive material, thereby preventing radiation from these elements of the radio frequency noise generated incident to their operation. A low pass filter is inserted in the power line to suppress conduction of the R. F. noise to the power supply. This filter is likewise shielded to suppress its own radiated interference. Furthermore, the entire body of shielded elements, and the controls therefor are completely insulated from the machine frame, and the shields are grounded directly to a ground lead from the power source. Therefore, the underlying principle of the present invention is the grounding of the R. F. interference circuit of a calculating machine directly to the power supply line to maintain the machine frame insulated from the entire electrical circuit.

Fig. 1 shows the general arrangement of the shielded parts of the machine. The machine motor 10, illustrated as a commutator-brush type motor, is substantially surrounded by an electromagnetic shield 11 of a suitable material which is perforated to allow air circulation for cooling the motor. The machine motor is provided with a governor 12, shown as a centrifugal governor, and a start-stop switch 13 which are located within the shield 11 as shown. Shield 11 is provided with an opening 14 through which the switch 13 partly extends. A removable plate 15 of suitable electromagnetic shielding material is provided to normally cover the opening 14 in shield 11; plate 15 therefore constitutes a continuation of the shield 11 but is removable to allow access to switch 13.

The motor 10 is mounted on the machine frame 16 but is insulated therefrom in the following manner. The motor is supported on a plurality of tapped metal bushings such as 19, and these bushings rest upon the base of shield 11 which in turn, rests upon layer 20 of insulating material, and the machine frame 16. A second layer 21 of insulating material is provided to separate the removable plate 15 from machine frame 16. Plate 15, layer of insulation 21, the machine frame 16, layer of insulation 20, and shield 11 each have apertures aligned with bushings 19 to receive tapped bushings 22 made of insulating material. A respective screw 23 extends through each bushing 22 and its related bushing 19 and is screwed into a tapped recess 24 in the motor housing. Therefore plate 15 is made electrically integral with the motor housing, being directly connected thereto by its associated screw 23. However, the machine frame 16 is electrically insulated from both the shield 11 and the plate 15 by the respective layers of insulation 20 and 21.

The switch 13 comprises a stationary contact 27 and a movable contact 28. Contact 27 is secured to a conducting plate 29 which is mounted on an insulation piece 30. Insulation piece 30 is secured to the motor housing by screws such as 31. The movable contact 28 is secured to a leaf spring 32 which is mounted at one end on insulation piece 30. Spring 32 maintains switch 13 normally closed as shown in Fig. 1.

During operation of the machine, switch 13 may be opened by the following mechanism. A switch operating shaft 33 is mounted for rocking movement within a bushing 35 of insulation material and extends through a small opening in the motor shield 11. Bushing 35 is mounted on a bracket 36 secured to the machine frame, and is restrained from transverse movement relative to bracket 36 by a spring clip 37. An insulation piece 38 is mounted on the lefthand end of shaft 33 and has an ear 39 underlying the free end of leaf spring 32. When shaft 33 is rocked in the proper direction, the ear 39 of insulation piece 38 lifts the free end of leaf spring 32 to separate the contacts 28 and 27 of switch 13, thereby opening the switch. The part of the shaft 33 which is within the shield 11 is grounded to the shield 11 by a lead 34, so that any high frequency energy which is picked up by the part of shaft 33 within the shield will not be radiated by that part of the shaft which extends outside the shield.

The mechanism for rotating shaft 33 includes a second shaft 40 axially aligned with shaft 33 but separated therefrom at 41. A sleeve 42 of insulating material is pinned to both shafts 33 and 40 so that rotation of shaft 40 causes simultaneous rotation of shaft 33. Shaft 40 is mounted for rotation within a supporting bracket 43 which is secured to the machine frame. A bell crank 45 (Fig. 2) is loosely mounted on shaft 40, and a lever 46 is securely mounted on shaft 40, lever 46 having an ear 47 from which an adjustable screw 48 extends leftwardly as viewed in Fig. 2. The bell crank 45 has an ear 49 on its upper arm for cooperation with screw 48, so that during operation of the machine when the lower arm 50 of bell crank 45 is raised, the bell crank is thereby rocked clockwise, by mechanism shown and described in Avery Patent No. 2,271,240, issued January 27, 1942. When bell crank 45 is rocked clockwise, its ear 49 cooperates with screw 48 to rock lever 46 clockwise, thereby rocking shaft 40, sleeve 42, shaft 33 and insulation piece 38 clockwise, so that ear 39 on insulation piece 38 raises the free end of leaf spring 32 to open switch 13. A spring 51 is secured between the upper arm of bell crank 45 and an ear 52 on lever 46 to maintain lever 46 in its counterclockwise position when the lower arm 50 of bell crank 45 is maintained in its downward position as shown in the drawing.

Since the start-stop switch 13 is located within the motor shield 11, direct adjustment of the contacts of that switch is made somewhat inconvenient. To facilitate such adjustment, the above-described screw 48 may be manually turned in either direction to cause the screw to extend a greater or lesser distance leftwardly. In this manner, adjustment may be made in the angle through which bell crank 45 must be rocked before the ear 49 of the bell crank engages the screw 48 to open switch 13.

The drive shaft 51 of the motor (Fig. 1) is insulated from the driven machine members in the same manner as described in connection with shaft 33. A sleeve 52, made of insulating material, is pinned to shaft 51 and to a driven shaft 53 which is axially aligned with shaft 51 and which is separated therefrom at 54.

Electrical power is supplied to the motor by a pair of input leads 55 (Fig. 3) from a suitable power source. A low-pass line filter 56 is interposed between the input leads 55 and the motor 10 for substantially eliminating conduction of high frequency current to the power source from the motor and from the governor and start-stop switch. This filter is shown in Fig. 3 as a conventional "Pi" section filter on each side of the power input line. Each section of the filter includes a coil 57 in series with the input leads, and a pair of capacitors 58 shunted from the power lead to a lead 59 connected to a ground terminal 60 in the power source. In the present embodiment, the motor field coils 61 are shown as constituting a supplementary part of the filter 56. The filter 56 as shown in Fig. 1, is supported by the motor shield 11 on a pair of conduits 62 which are formed of electromagnetic shielding material. The filter is enclosed in a casing 63 which is likewise of electromagnetic shielding material. The electric leads from the input terminal to the filter and from the filter to the motor are enclosed within conduits 62 and are thereby substantially prevented from radiating high frequency electromagnetic energy to the atmosphere outside the conduits. The shields are grounded through lead 59 to the ground terminal 60 in the power source, as shown in Fig. 3.

The start-stop switch 13 is interposed between the motor armature 64 and one of the field coils 61, and the governor 12 is interposed between switch 13 and armature 64. A resistor 65 is connected in parallel with governor 12 so that when the governor contacts are open the current flow through armature 64 is merely reduced and not completely cut off. A capacitor 66 and a resistor 67 are connected in series with each other and in parallel with the governor 12 and switch 13 to reduce sparking of the governor and switch contacts.

I claim:

1. In a calculating machine having, a machine frame, an electric motor for driving the machine, said motor including a commutator and brushes, and a source of electrical power including a power lead for said motor; the combination of, means for electrically insulating the motor and the power source from the machine frame, an electromagnetic shield insulated from said machine frame and substantially surrounding the motor to inhibit radiation of electromagnetic energy from the commutator and brushes, a ground lead in the power source, a low-pass filter interposed between the motor brushes and the power source to inhibit conduction of high frequency current from the brushes to the power source, said filter including a capacitor connected between the power lead and said ground lead, an electromagnetic shield insulated from said machine frame and substantially surrounding the filter to inhibit radiation of electromagnetic energy from said filter, and a respective electrical connection between each of said shields and said ground lead for grounding said shields.

2. In a calculating machine having, a machine frame, an electric motor for driving the machine, a source of electrical power including a power lead for said motor, and a start-stop switch for opening and closing the circuit from said power source to the motor; the combination of, means for insulating the motor, the power source and the start-stop switch from the machine frame, an electromagnetic shield insulated from said machine frame and substantially surrounding the motor and switch for inhibiting radiation of electromagnetic energy from said motor and switch, a ground lead in the power source, a low-pass filter interposed between the motor and the power source for inhibiting conduction of high frequency current from the motor and switch to the power source, said filter including a capacitor connected between the power lead and said ground lead, an electromagnetic shield insulated from said machine frame and substantially surrounding the filter for inhibiting radiation of electromagnetic energy from said filter, and a respective electrical connection between each of said shields and the ground lead for grounding said shields.

3. In a calculating machine having, a machine frame, an electric motor for driving the machine, a source of electrical power including a power lead for said motor, and a governor on said motor for controlling current from said power source to the motor; the combination of, means for electrically insulating the motor, the power source, and the governor from the machine frame, an electromagnetic shield insulated from said machine frame and substantially surrounding the motor and governor for inhibiting radiation of electromagnetic energy from the motor and governor, a ground lead in the power source, an electrical connection between the shield and said ground lead, a low-pass filter interposed between the motor and the power source for inhibiting conduction of high frequency current from the motor and governor to the power source, said filter including a capacitor connected between the power lead and said ground lead, and means for inhibiting radiation of electromagnetic energy from said filter.

4. In a business machine having, a machine frame, an electric motor for driving the machine, a source of electrical power including a power lead for said motor, and control elements including, a motor governor for controlling the current from the power source to the motor, and a start-stop switch for turning on and off the current from the power source; the combination of, means for insulating the motor, the power source and said control elements from the machine frame, an electromagnetic shield insulated from said machine frame and substantially surrounding the motor and the control elements for inhibiting radiation of electromagnetic energy from said motor and from said control elements, a ground lead in the power source, an electrical connection between the shield and said ground lead, a low-pass filter interposed between the motor and the power source for inhibiting conduction of high frequency current from the motor and from said control elements, said filter including a capacitor connected between the power lead and said ground lead, and means for inhibiting radiation of electromagnetic energy from said filter.

5. In a business machine having, a machine frame, an electric motor for driving the machine, a source of electrical power including a power lead for said motor, and a start-stop switch effective when closed or opened to turn on and off, respectively, the current from said power source to the motor; the combination of, selectively operable mechanism for opening or closing said switch, means for electrically insulating the switch from said selectively operable mechanism, means for insulating the motor, the power source and the switch from the machine frame, an electromagnetic shield insulated from said machine frame and substantially surrounding the motor and the switch to inhibit radiation of electromagnetic energy from said motor and from said switch, a ground lead in the power source, an electrical connection between the shield and said ground lead, a low-pass filter interposed between the motor and the power lead to inhibit conduction of high frequency current from the motor and switch to the power source, said filter including a capacitor connected between the power lead and said ground lead, and means for inhibiting radiation of electromagnetic energy from said filter.

References Cited in the file of this patent

UNITED STATES PATENTS

| | | |
|---|---|---|
| 1,843,525 | Thomas et al. | Feb. 2, 1932 |
| 1,998,580 | Heuberger | Apr. 23, 1935 |
| 2,008,377 | Whitaker | July 16, 1935 |
| 2,048,096 | Bisley | July 21, 1936 |
| 2,165,886 | Daniel | July 11, 1939 |
| 2,219,121 | Thunberg | Oct. 22, 1940 |
| 2,227,125 | Cook | Dec. 31, 1940 |
| 2,242,333 | Thunberg | May 20, 1941 |

FOREIGN PATENTS

| | | |
|---|---|---|
| 167,097 | Great Britain | Aug. 4, 1921 |